(12) United States Patent
Jordan et al.

(10) Patent No.: US 7,965,862 B2
(45) Date of Patent: Jun. 21, 2011

(54) METHOD TO APPLY AN INVISIBLE MARK ON A MEDIA

(75) Inventors: Frederic Jordan, Les Paccots (CH); Martin Kutter, Remaufens (CH); Nicolas Rudaz, Veyras (CH)

(73) Assignee: Alpvision SA, Vevey (CH)

( * ) Notice: Subject to any disclaimer, the term of this patent is extended or adjusted under 35 U.S.C. 154(b) by 959 days.

(21) Appl. No.: 11/816,027

(22) PCT Filed: Feb. 15, 2006

(86) PCT No.: PCT/EP2006/050973
§ 371 (c)(1),
(2), (4) Date: Aug. 10, 2007

(87) PCT Pub. No.: WO2006/087351
PCT Pub. Date: Aug. 24, 2006

(65) Prior Publication Data
US 2008/0149820 A1    Jun. 26, 2008

(30) Foreign Application Priority Data
Feb. 15, 2005    (EP) .................................... 05101114

(51) Int. Cl.
*G06K 9/00*    (2006.01)
(52) U.S. Cl. ...................................................... 382/100
(58) Field of Classification Search .................. 382/100, 382/115, 116; 713/170, 171, 176; 283/69, 283/72, 74, 93, 113; 358/3.28
See application file for complete search history.

(56) References Cited

U.S. PATENT DOCUMENTS

| | | | |
|---|---|---|---|
| 4,360,548 A * | 11/1982 | Skees et al. ...................... 428/29 |
| 5,363,949 A | 11/1994 | Matsubayashi | |
| 5,837,042 A * | 11/1998 | Lent et al. .................. 106/31.14 |
| 6,104,812 A | 8/2000 | Koltai et al. | |
| 6,431,448 B1 * | 8/2002 | Nelson et al. ............ 235/462.13 |
| 6,477,431 B1 | 11/2002 | Kalker et al. | |
| 6,549,640 B1 * | 4/2003 | Sansone et al. ................ 382/101 |
| 6,600,823 B1 * | 7/2003 | Hayosh ........................... 380/51 |
| 7,388,689 B2 * | 6/2008 | Lapstun et al. .............. 358/3.28 |
| 7,695,090 B2 * | 4/2010 | Kawamura et al. ............. 347/19 |
| 2003/0128861 A1 | 7/2003 | Rhoads | |
| 2004/0093498 A1 * | 5/2004 | Noridomi et al. ............. 713/176 |

(Continued)

FOREIGN PATENT DOCUMENTS

EP    0961239    12/1999
(Continued)

OTHER PUBLICATIONS

International Search Report, International Patent Application No. PCT/EP2006/050973, filed Feb. 15, 2006.

*Primary Examiner* — Matthew C Bella
*Assistant Examiner* — Shervin Nakhjavan
(74) *Attorney, Agent, or Firm* — DLA Piper LLP US

(57) ABSTRACT

The present application aims to propose a solution for embedding invisible mark suitable for very large production volumes. This is achieved by a method for applying an invisible mark on a media based on a pattern, and comprising the following steps: determining an area to apply this mark, applying a transparent or semi-transparent substance, on the media, said substance being modulated with the active dots to form the pattern by modifying the quantity of the substance at each active dot.

21 Claims, 5 Drawing Sheets

U.S. PATENT DOCUMENTS

| | | | |
|---|---|---|---|
| 2004/0233465 A1* | 11/2004 | Coyle et al. | 358/1.9 |
| 2005/0018874 A1* | 1/2005 | Rhoads | 382/100 |
| 2005/0057594 A1* | 3/2005 | Kakutani | 347/15 |
| 2007/0110274 A1* | 5/2007 | Brundage et al. | 382/100 |
| 2009/0232350 A1* | 9/2009 | Sharma et al. | 382/100 |
| 2010/0225975 A1* | 9/2010 | Silverbrook et al. | 358/3.28 |

FOREIGN PATENT DOCUMENTS

| | | |
|---|---|---|
| GB | 2299301 | 10/1996 |
| GB | 2347646 | 9/2000 |
| WO | WO0225599 | 3/2002 |
| WO | WO02089464 | 11/2002 |

\* cited by examiner

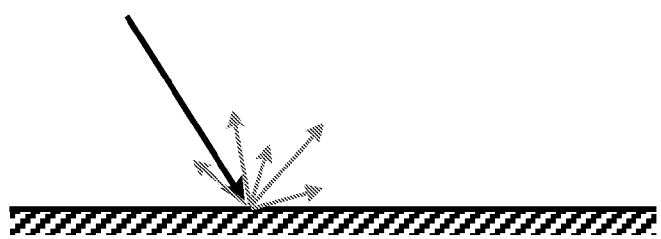
Fig. 7
Fig. 8
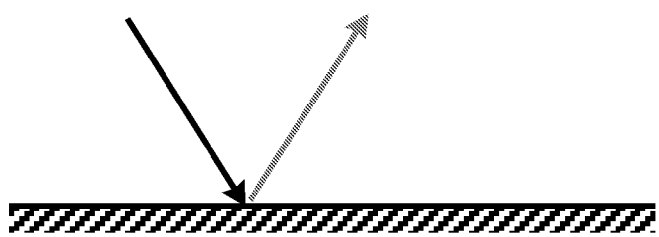
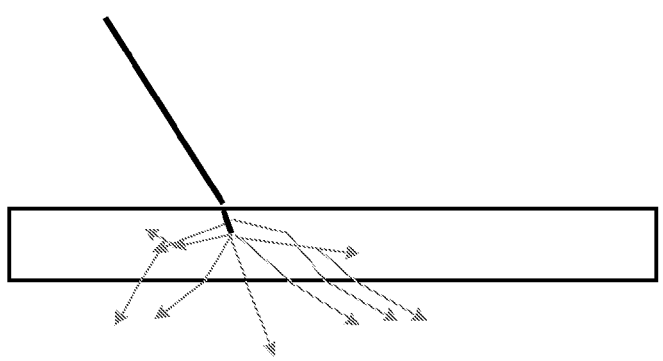
Fig. 9
Fig. 10
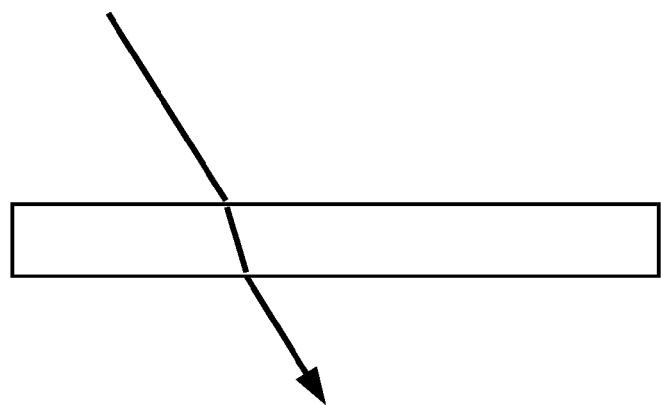

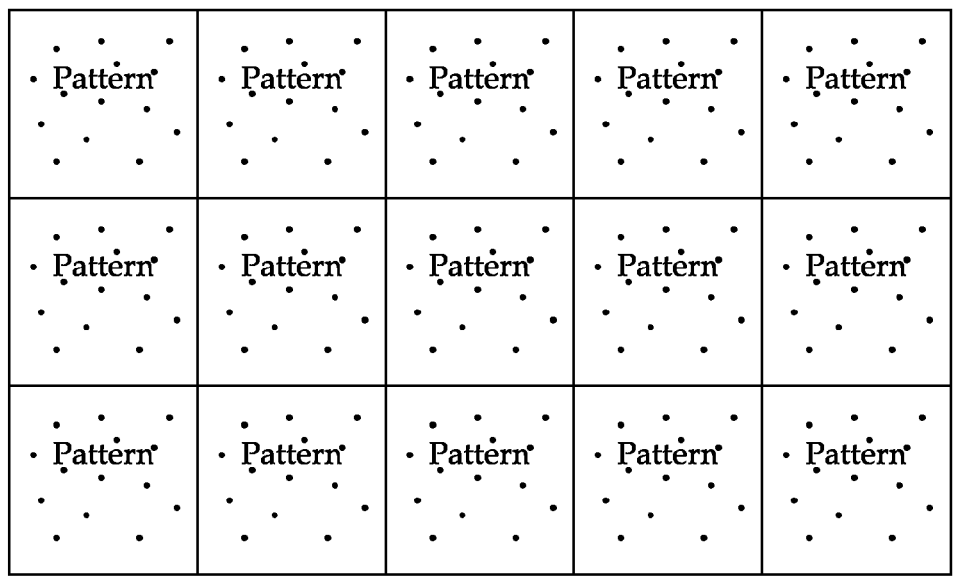
Fig. 13
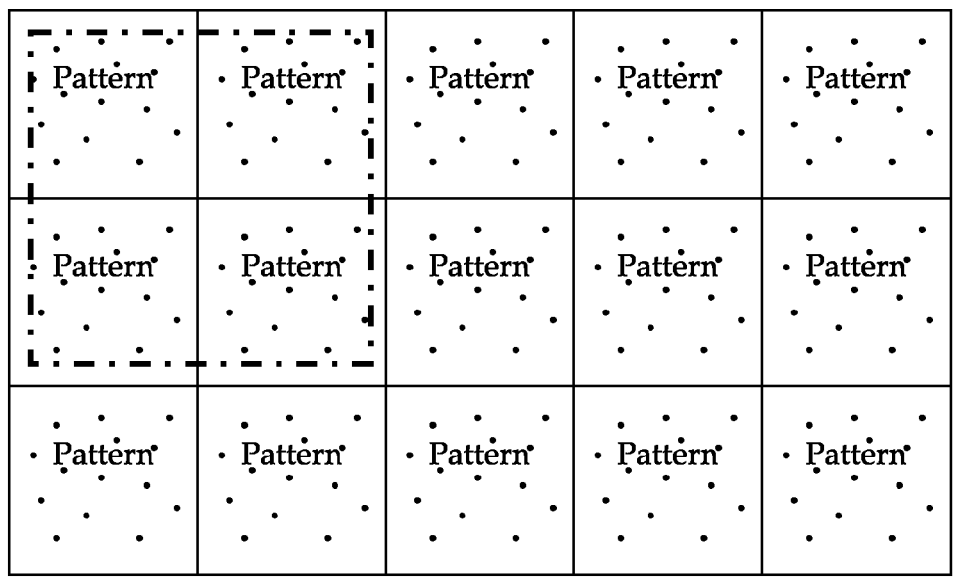
Fig. 14
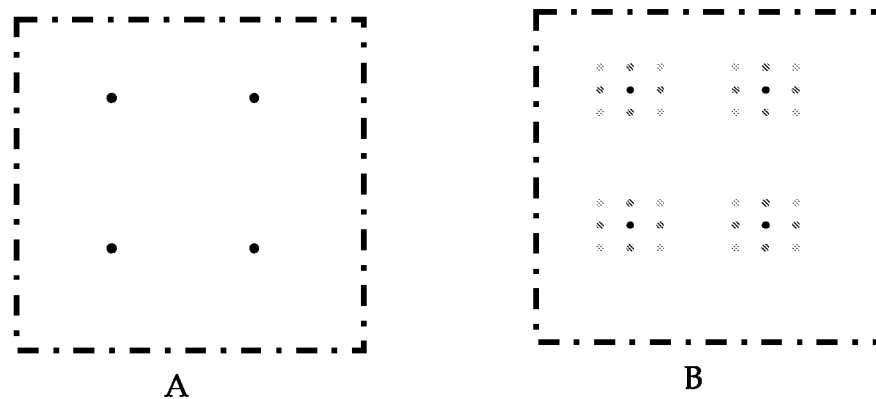
A          B

METHOD TO APPLY AN INVISIBLE MARK ON A MEDIA

INTRODUCTION

This invention concerns the field of placing an authentication mark on a media to detect copying and counterfeiting of said media, this latter being documents or package, possibly made of paper or carton, but not limited to these materials. The mark also thwarts attempts at unauthorized modifications of the document by storing a checksum of the genuine document; it also enables tracking and tracing products through the insertion of an identification code.

PRIOR ART

In the field of invention, one can find two categories of marks, namely:
  visible marks
the mark serves for the authentication of the media bearing the mark, by the customer himself or by an authorized dealer, by visually checking the presence of the mark. One can find such a technology on bank notes, including watermarks, 3D hologram pictures, tiny holes, metallic threads, and inks having special optical properties.
  invisible marks
invisible is meant as not discernible to the naked eye. Such marks are hidden on the surface of a product so that a counterfeiter has no knowledge of the presence of this mark The present invention will focus only on invisible marks.

Known techniques for applying such a mark have been described in the document WO02/25599 in which the ink is used to create a symmetrical or asymmetrical modulation corresponding to the mark.

The formation of the mark is based on the use of very small structures, for example in the form of dots (e.g. 10 to 80 μm), spread over the surface to be marked. Depending on the process used to add the structures onto the media, for example through printing in combination with halftoning, special consideration has to be given concerning the creation of aggregated dots with sizes of over 100 μm. In some cases, these aggregates may be a desired characteristic (for instance with very low contrast inks like varnish) or an unwanted characteristic (with higher contrast ink for instance).

The symmetrical method could be used when the image is printed simultaneously with the mark. The color is modulated by adding or subtracting a dot from the original design in order to form the mark. A different embodiment would consist in modifying the spectral reflectance of the pigment or the ink used to print the mark.

The asymmetrical method has fewer constraints and could for example be used in both while printing the image, before printing the image, or even at a later stage through overprinting. This method fundamentally exists in adding local contrast, for example by printing colored dots, in order to form the mark on a blank area, an area with an uniform color or an area containing a decorative image.

Even if these methods are satisfying for many applications, in case of very large production volumes, one can notice that the realization of the invention is very difficult due to the fact the deployed printing methods for very large production volumes have constraints, such as the maximum printing speed.

SHORT DESCRIPTION OF THE INVENTION

The present invention of applying an invisible mark solves this problem through methods specifically tailored for large production volume.

The present invention concerns a method for authenticating and tracing an industrially printed material in a manner that is invisible for the naked eye based on the addition of pseudo-random defects on the surface of said material by the means of any industrial printing technology based on the deposit of a liquid substance capable of solidification upon drying, said substance modifying at least one optical characteristic of said material, said defects having an individual size ranging from 10 to 500 micrometers and an individual location based on the active dots of a mark representing a pseudo-random digital two dimensional pattern initialized by a key, said mark being detected at a later time by measuring the signal to noise ratio of the two dimensional digital signal obtained by cross-correlating said pattern with a digital two-dimensional digital image of the printed material.

This substance modifies the characteristics of the reflected light. It can take the form of an ink, a varnish, a glue or a plastic coating. If this substance is transparent, it will not affect the underlying image on the media.

In one embodiment of the invention the calculated mark has very specific auto-correlation properties facilitating recovery after affine transformations.

When using varnish, it is applied during the last operation, after the image is applied on the media. The varnish could be in a form of a resinous solution giving a hard shiny transparent coating.

While applying this coating, the application process is modified so as to produce irregularities (appearing like "defects") on the transparent layer. These irregularities are the result of the modulation with the mark, in particular with the active dots; they correspond to small local variations of the surface's reflectance When using an ink, the defects will be typically introduced as local and slight lacks or excess of ink in uniformly painted areas. Such defects will then correspond to respectively a local increase or a local decrease of the lightness.

In the following we will use the term "substance" to generically name ink or varnish.

The main advantage of this method is that a counterfeiter has a great difficulty to imitate or duplicate the modulated coating with standard methods such as high resolution scanners and printers, because neither scanners nor printers allow to resolve and duplicate such slight variations in reflectance, lightness or color.

The aim of this invention is to modulate the external surface of a media to embody the mark without visually altering the color of the media and in such a way that this modulation appear like naturally occurring variations or defects. Even if the preferred embodiment consists in a modulation of the coating during its application, other embodiments can be used for the application of the mark, for example with pressure, by laser, or engraving.

SHORT DESCRIPTION OF THE FIGURES

The present invention will be better understood, thanks to the attached drawings, which are given as non limiting examples, in which:

FIG. 1 shows a positive and negative modulation of the substance,

FIGS. 2a and 2b show a modified substance layer with completely removed regions at the place of the active dots, FIG. 3 shows a substance layer with reduced thickness at the place of the active dot, FIG. 4 shows the gravure method, as explained below, FIGS. 5a, and 5b show another example of modulating the substance thickness, FIG. 6 shows a method to avoid any difference in reflectance between marked and unmarked areas FIGS. 7 to 10 show the various ways in which the light can interact with the modulated coating, FIG. 11 shows the variation of the cross-correlation factor during the detection process, FIG. 12 shows the result of a cross-correlation with an auto-correlated mark.

FIG. 13 shows how a pattern can be tiled to cover a larger area.

FIG. 14 shows the cross-correlation peaks obtained with tiled patterns which are themselves auto-correlated (B) or not auto-auto-correlated (A).

DETAILED DESCRIPTION

Figure 1:
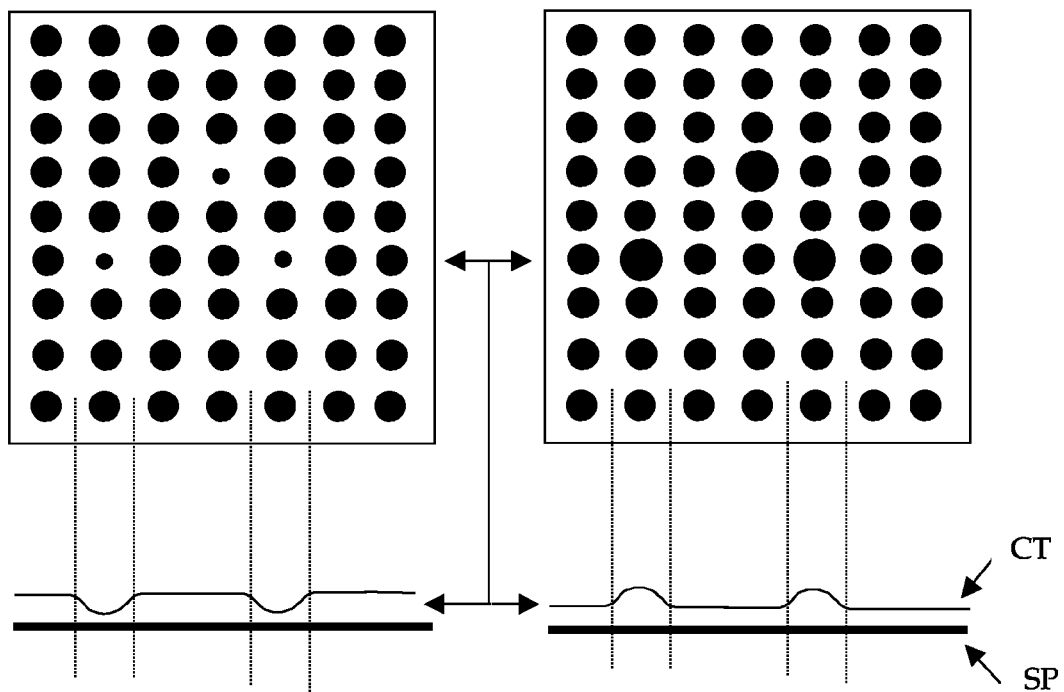

In the present invention, we have three main coating modulation methods. The first one is illustrated in FIGS. 1 (left side) and 3. The quantity of substance CT applied on the media SP is lowered in some places (black dots).

Figure 2A:
Figure 2B:
Figure 3:

The second method is illustrated by FIGS. 2a and 2b in which the quantity of the substance is reduced so that no substance is present on the media at least in the centre of the active dot.

The third method is illustrated in FIG. 1 (right side). The substance modulation is positive, i.e. more substance is applied where active dots are to be generated.

Variation of these modes is also part of the present invention, e.g. the example illustrated in FIG. 2a is obtained only if more than one adjacent active dot is defined. FIG. 2b shows the active dots with dashed lines and the inactive dots with solid lines. In this example, it is necessary to have at least two adjacent active dots to create a negative modulation of the thickness of the substance coating, that is, generate a lack of substance on the media.

There exist several methods for producing the coating and the present invention is not limited to the examples below.

According to a first embodiment, the initial mark is defined with a high resolution, e.g. 2500 dpi or higher, thus leading to a dot size of 10 um. This mark is created by using a pseudo-random generator that will generate a set of randomly spread dots for a given density and a given seed of the pseudo-random generator. The random seed is called the "key" of the mark. The active dots are defined at this resolution without taking special care of the aggregation of dots. The usual system to apply the coating is often based on a low resolution raster (e.g. 80 lines per cm) since there is no need for the accurate rendering of an image. This resolution is high enough to apply the coating on selected zones and suppress it on other zones.

The initial mark is sub-sampled at this low resolution and the resulting mark, also called printed mark, does usually consist of active dot aggregations (such aggregate could have a size as large as 500 um).

In order to increase the detection rate and reliability, the initial mark can be generated in such a way that it possesses inherent auto-correlation properties. For example, an auto-correlated mark can be generated by starting with a first random (or pseudo-random) pattern according to a first raster, i.e. on the even lines and rows of the initial resolution grid. This first random mark is then duplicated and applied on the same image with an offset. This offset is preferably an odd increment of the lines or rows, so as to avoid the unwanted superimposition of some of the dots of the original random pattern with dots of the second shifted pattern. This process can be repeated several times. For instance, the final image can include four times the initial random pattern shifted in X, and Y and XY. The table below shows an example of an auto-correlated mark containing four times the first pattern. Please note that the fourth image is translated at a angle of 45°. Other values are applicable such as a different offset in X than in Y (e.g. 33 in X and 11 in Y). It is also possible to apply a magnification factor to the shifted marks, e.g. the image 2 is a 200% magnification of the first image that is then shifted according to the predefined offset. In this example, the image one is the first image.

| Image | X offset | Y offset |
| --- | --- | --- |
| 1 | 0 | 0 |
| 2 | 35 | 0 |
| 3 | 0 | 35 |
| 4 | 35 | 35 |

The claimed method has four main advantages: (1) it is invisible, (2) it is not affected by the underlying printed image, (3) it works on unprinted areas as well as on printed areas, (4) it does not require a high resolution printing process. In previous methods, the invisibility requires the use of a high resolution printing process, or the application of a watermark to a preexisting existing image by adding slight distortions to that image.

Gravure

The gravure method is a process in which the image is formed below the surface of the printing medium.

The printing image consists of recessed cells engraved in a metal image cylinder. The cells define the image and the color density is a function of the ink volume deposited in the cell, this volume being defined by the size of the cell.

This size can be adjusted in two ways, i.e. controlling the depth of the cell of equal surface or varying the surface of a cell of equal depth.

Figure 4:
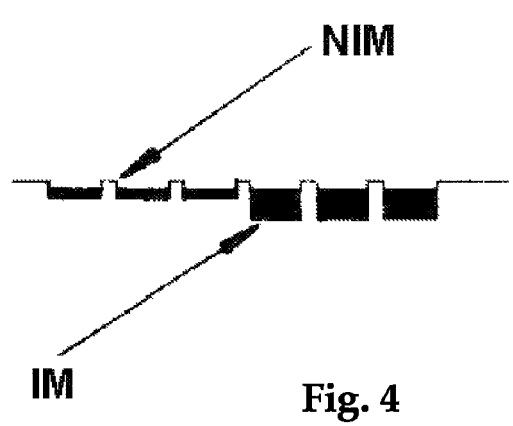

In the FIG. 4, the printed image consists of recessed cells engraved in a metal image cylinder CYL. This image cylinder CYL runs in an ink duct ID containing low viscosity liquid ink. A metal doctor blade BL held against the rotating cylinder CYL then scrapes the surplus ink from the non-image surface of the cylinder. The paper P is applied on the image cylinder CYL by way of two rollers, namely the impression roller IMR and the back up roller BUR.

Figure 5A:
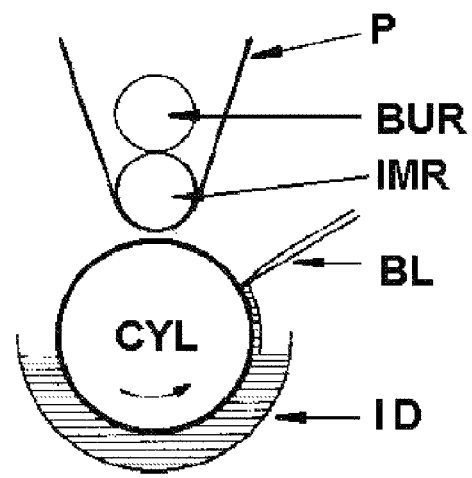
Figure 5A:
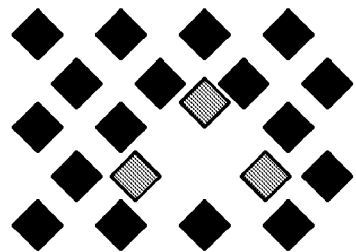
Figure 5B:

It is possible not to follow the initial raster shown in FIG. 1. In FIGS. 5a and 5b, another modulating method is illustrated. The image cylinder CYL is engraved with a diamond head of which the X, Y displacements and the impact force is computer controlled. Other manufacture methods are possible to prepare the cylinder such as using chemical etching. The gray dots are dots moved from their initial locations. It is then possible not only to remove substance where active dots are to be applied but strengthen the effect by adding surplus close to the depression. This facilitates the detection since not only the depression but also the substance surplus generates an altered signal on the scanner input.

Figure 6:
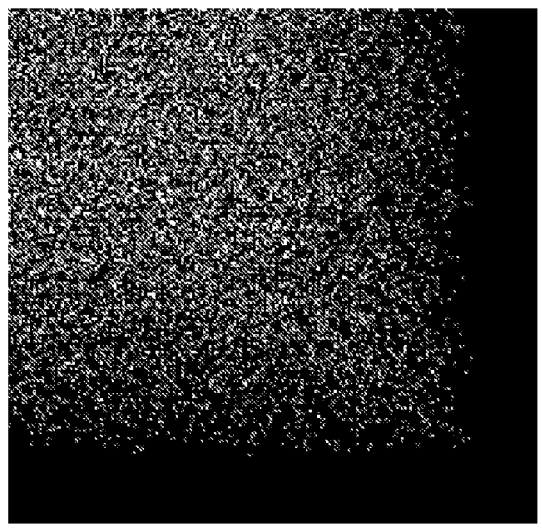

FIG. 6 shows a magnification of a mark in which the white dots represent the absence of substance. It is to be noted that the density of white dots decreases near the borders of the mark.

In one embodiment, two regions are defined in the marked area, the first one being the mark itself and the second one being a transitional area. As an example, the mark has a density of 10% and the transitional area has progressive shading starting from 10% density down to close 0%. In this case the naked eye will not notice clear differences where the mark is located and where no mark is present.

Another method to completely hide the mark, in particular to avoid the detection of difference in lightness or in reflectance, is to apply on the remaining part of the media (not bearing the mark) a pseudo-mark with the same density. A random mark or a pattern with different statistical properties than the main mark is generated with the same average density and applied on the media. This pseudo-mark may also provide useful information for the detection like spatial synchronization, complementary encoding capacities, additional robustness characteristics, etc. Yet another solution is simply to tile the mark across the media, thus also avoiding any visual difference between the marked and non-marked area.

Lithography, Flexography and Other Printing Processes

Similarly to the gravure method, other printing processes are also applicable in the frame of the present invention. In offset printing processes, ink is not applied directly from the printing plate (or the cylinder) to the substrate as it is in gravure, flexography and letterpress. Ink is applied to the printing plate to form the "image" (such as text or artwork to be printed) and then transferred or offset to a rubber "blanket". The image on the blanket is then transferred to the substrate (typically paper or paperboard) to produce the printed product.

The printing plate, generally an aluminum-based plate, contains a light-sensitive coating applied or coated over the aluminum. With ultra-violet light and with the help of a mask to allow the ultra-violet rays to strike the photopolymer only on the place where the image is to be formed. According to the present invention, the mask is modified to embody the mark to be hidden while applying the substance. The process to produce the substance printing plate will be modified to produce the mark.

Detection

The detection is based on the use of a standard scanner or any other imaging device (digital camera, microscope, photodiode, etc) with an appropriate software program to recover the mark. The modulation of the substance thickness leads to a very low dynamic of the received signal. The low dynamic is typically due to the transparent nature of the substance as well as difference in reflectance and results in a small signal to noise ratio, making the recovery of the mark very challenging.

The amount of light reflected by an object, and how it is reflected, is highly dependent upon the smoothness or texture of the surface. In the real world most objects have convoluted surfaces that exhibit a diffuse reflection, with the incident light being reflected in all directions. A varnish is known to increase the specular component of the reflected incident light. The absence (or the reduced thickness) of the varnish increases the diffuse reflection. Also, the diffuse light that is reflected from the non-varnished surface is scattered in all directions. The light sensor detects the variation of the reflected light and allows detection of the mark. In a case of a less transparent substance like an ink, the main phenomena is diffuse reflection and the local quantity of substance will affect the color (for instance the lightness will decrease with a higher quantity of ink).

FIGS. 7 to 10 illustrate the different categories of light interaction. FIG. 7 shows a diffuse reflection on a rough surface. The emitted light is reflected equally in almost every direction. FIG. 8 shows a specular reflection, e.g. on a mirror. The emitted light is reflected in only one direction. FIG. 9 shows the light behavior on a translucent medium. The light propagation diffuses into the translucent layer resulting in a diffuse pattern of the light exiting this layer.

FIG. 10 shows the light behavior in a transparent layer such as a varnish. The impact point of the light arriving on the media is dependent on the varnish thickness. The reflected light is therefore influenced by the varnish thickness.

While analyzing the pattern of the reflected light, it is difficult to retrieve the mark as originally defined, i.e. the active and passive dots. One important reason for this is that the pattern was engraved with a resolution much lower than the original resolution. For instance a mark may be defined with a 1024×1024 pixels bitmap at 1200 dpi (each pixel represents ~20 µm) but rasterized with a coarse screen resolution of 80 lpc (with corresponds to lines spaced by 125 um), thus leading to a maximum effective resolution of about 200 dpi (without taking into account the screen angle which may further decrease this value). The detection difficulty may also increase due to wearing and scratches of the marked surface.

The detection method is based on a two-dimensional cross-correlation of the referenced mark and the image currently analyzed. The referenced mark is superposed on the image analyzed and a matching analysis is performed. This analysis is not a pass/fail test but rather a correspondence test with a maximum when both images are superposed and in perfect correspondence. If the pattern has been tiled all over the media (FIG. 13) then the cross-correlation can be computed using any cropped area of the package. If the area is larger than the reference pattern, several peaks will be visible on the cross-correlation image (FIG. 14A) corresponding to each tile. Moreover, if the pattern is autocorrelated (4 times for instance) then there will be multiple peaks (9 peaks for an XY autocorrelation of 4) for each tile (FIG. 14B).

This analysis also requires that reference and test pattern have the same scale and the same rotation angle.

The scale of the printed pattern can be very different from the reference pattern. For instance, the pattern may be slightly larger than the original or it may be stretched perpendicularly to the printing cylinders axis. The scaling can be derived by different methods: using the theoretical characteristics of the printing process, using visible design elements or cut-outs whose size is known, using a dichotomy-based heuristic or using some auto-correlation properties of the pattern (or other complementary pattern added for this purpose). Generally, this scale factor does not vary substantially between successive print-outs and can be considered as a constant for a given printing series.

Figure 11:
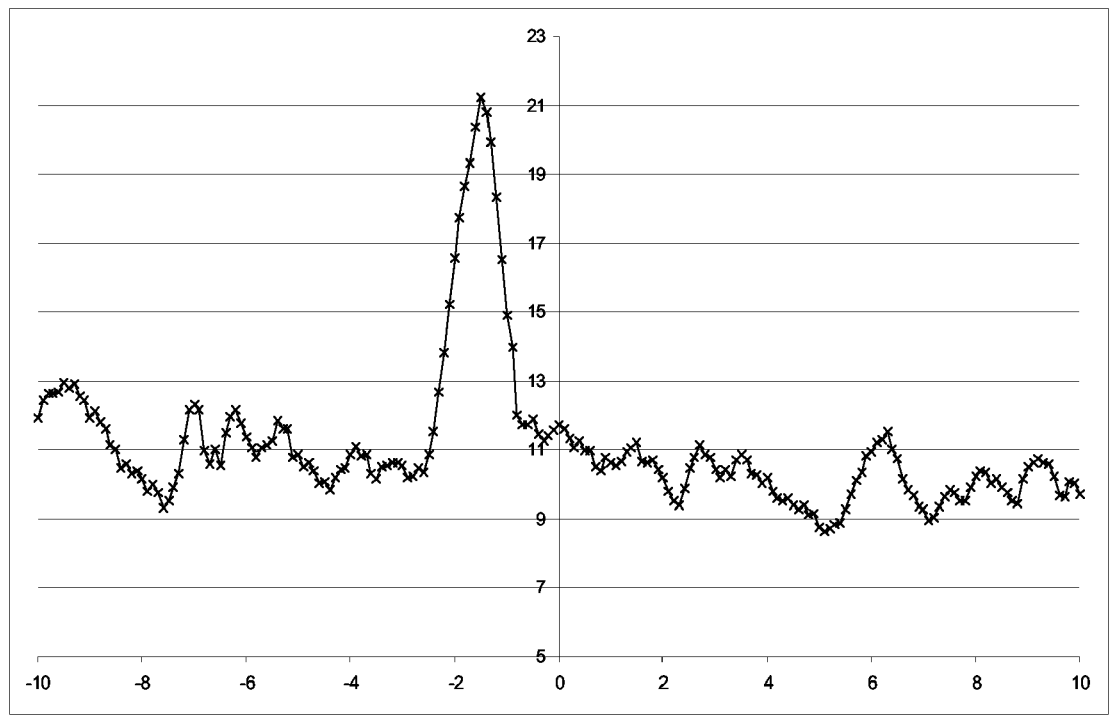

The rotation angle comes by the imaging process: indeed one millimeter of misalignment during scanning may mean a rotation of one or several degrees for a pattern a of few centimeters size. This angle can be determined by several methods: using the microstructure properties of the paper (the paper grain is generally different in the printing direction), the micro-traces left by the doctor blade on the paper, some known elements of designs or cut-outs, autocorrelation of the pattern (or other complementary pattern added on purpose) or a dichotomy-based heuristic procedure. FIG. 11 illustrates the variation of the cross-correlation factor as a function of the rotation of the reference pattern. In this example, it can be seen that the maximum is obtained for a rotation of approximately −2 degrees, which means that the printed sample was rotated by this angle during the scanning process.

Another approach consists in using the log transform. If $P(x,y)$ is the pattern and $S(x,y)$ is the analysed image, a cross-correlation is performed between $P(Ln(x), Ln(y))$ and $S(Ln(x), Ln(y))$, where Ln is the neperian logarithm function. The properties of the Ln( ) function is such that the position of the maximum of the obtained cross-correlation image corresponds to the scaling factor. Assuming that the scaling factor is the same in the x and y direction, it is also possible to combine a polar transform, using radius-angle (r,t) coordinates in place of rectangular (x,y) coordinates, with a log transform. The signal can then be written as P(Ln(r), t). The location of maximum of cross-correlation of the so-transformed P and S images gives the scaling factor and the rotation angle between the two images.

Figure 12:
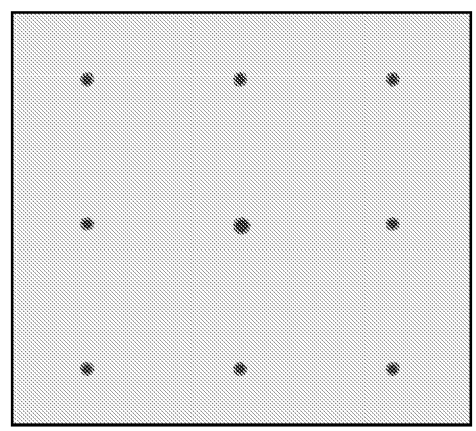

The fact that the printed mark is auto-correlated (see above) is very useful in the detection process. Due to the high noise resulting of the substance modulation, as well as the viscosity of said substance, a direct recovery of the initial mark is unfeasible. This is the reason why a cross-correlation process is applied during the detection process. Due to the fact that the printed mark is auto-correlated, the cross-correlation process will yield several maxima of intensity, the number of these maxima depending on the auto-correlation properties of the mark. In our example having four images superposed, the number of energy peaks is nine with one being taller than the others. This is illustrated in FIG. 12 in which the energy peaks are marked with black dots. The center dot corresponds with the exact superposition of the auto-correlated mark in the scanned image.

The distance between each energy peak is not random but is directly related to the offset while generating the auto-correlated mark. The offset is checked against the reference offsets and if the distance is the same, the scanned mark is genuine.

During the cross-correlation process, the mark used as reference could be issued from different steps:

The first random mark: the cross-correlation of the scanned mark with the first random mark (not auto-correlated) gives a number of energy peaks equal to the number of auto-correlations. In our previous example, the first random mark was auto-correlated four times. As a result the cross-correlation will give four energy peaks, the distance between each peak being directly proportional to the offset at the generation of the auto-correlated mark. It is to be noted that all energy peaks are normally equal.

The auto-correlated mark: the cross-correlation of the scanned mark with the initial auto-correlated mark gives a number of energy peaks larger than to the number of auto-correlation, e.g. 9 peaks for a mark four times auto-correlated. The particularity is that one of the peaks has a bigger energy.

The scanned mark: the cross-correlation of the scanned mark with itself gives also the energy peaks, in the same way that with the auto-correlated mark. In order to prove that this mark is genuine, it is possible to use the pattern of the nine energy peaks and compare it with a reference. The X, Y offsets defined in the auto-correlation properties of the mark can also encode information on the owner of the mark.

Another advantage of the auto-correlation is that it allows the detection of possible modification of the media, such as affine transformations, or the printing process. Due to variation of temperature of the media or variation of the printing cylinder, the scale could be slightly modified, i.e. the mark is stretched.

In a first step, the scanned mark is cross-correlated with itself. The distance and location of the four peaks allows the determination of the rotation and the actual scaling of the mark, that is, the affine transformation. These values are introduced in the further detection steps i.e. modifying the referenced mark, in this example the auto-correlated mark. Alternatively, the scanned mark is adjusted to be in line with the auto-correlated mark. These modifications have the consequence that they compensate physical modifications of the media.

One advantage of this method is that the scanning resolution can be different than the one used for creating the mark. Since only the general pattern of the mark is detected, this can be done with a scanning process having a coarse resolution such as 3 to 4 times less than the initial mark. As mentioned above, this assumes that the original mark also undergoes the same re-sampling process in order to match the one performed by scanning.

In the previous step, the image underlying the varnish or ink is analyzed so as to extract the image and keep only the mark. This can be done by establishing the average color intensity over a selected area, this area being at least larger than the elementary analysis surface. After having calculated the average color intensity for that area, this value is subtracted to each elementary analyzed surface so as to obtain only the substance modulation. Other methods are also possible, for example based on statistical prediction methods, such as Wiener filtering, or any other type of noise filtering methods.

In a first embodiment, the referenced marks are successively correlated with the reading image until a match is found.

In a second embodiment, the detection device comprises a library of the possible marks and before the correlation process, the image underlying the substance is detected e.g. the logo of the manufacturer. This detection is used to select one of these stored referenced marks. From that detection, the appropriate referenced mark is loaded in the correlation process and the matching mechanism can start. In a third embodiment, the detection device comprises a library of the possible marks and each mark is successively correlated with the reading image until a match is found. Each mark of the library may have been for instance generated using a different seed of the pseudo-random generator. Instead of a library it is also possible of course to generate the pseudo-random mark on the fly.

The invention claimed is:

1. A method for authenticating and tracing an industrially printed material, comprising:
    applying a mark in a manner that is invisible for the naked eye based on the creation of pseudo-random defects on the surface of said material by the means of an industrial printing technology using a liquid substance capable of solidification upon drying in which the liquid substance is deposited over at least a portion of the material with a regular thickness in areas other than individual locations corresponding to active dots of the mark and having a modulated thickness in areas corresponding to the active dots of the mark, the active dots representing a pseudo-random two dimensional pattern initialized by a key, said substance modifying at least one optical characteristic of said material, said defects having an individual size ranging from 10 to 500 micrometers; and
    detecting said mark at a later time by measuring the signal to noise ratio of the two dimensional digital signal obtained by cross-correlating said pattern with a digital two-dimensional digital image of the printed material.

2. The method according to claim 1, wherein the substance is an ink, a varnish, a plastic or a glue coating.

3. The method to detect a mark applied according to the method of claim 2, comprising the following steps:
    acquiring an image comprising the mark,
    auto-correlating the acquired image so as to determine the rotation and the scaling factors,
    applying the rotation and scaling factors in a cross-correlation process between a referenced mark and the acquired image,
    determining the maximum energy peaks of the cross-correlation process and comparing these energy peaks with a reference.

4. The method according to claim 1, wherein the quantity of the substance is lowered at each active dot.

5. The method to detect a mark applied according to the method of claim 4, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

6. The method according to claim 1, wherein the quantity of the substance is increased at each active dot.

7. The method to detect a mark applied according to the method of claim 6, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

8. The method according to claim 1, wherein the substance is completely removed where active dots are defined.

9. The method to detect a mark applied according to the method of claim 8, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

10. The method according to claim 1, wherein the mark applied comprises auto-correlation characteristics, in which a first mark is at least one time duplicated and shifted so that the superposition of the first mark and the shifted one form the applied mark.

11. The method according to claim 10, wherein the first mark is duplicated four times, the first duplication being shifted according to the X axis, the second duplication being shifted according to the Y axis and the third duplication being shifted according to both X and Y axes.

12. The method to detect a mark applied according to the method of claim 11, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

13. The method to detect a mark applied according to the method of claim 10, comprising the following steps:
acquiring an image comprising the mark, ,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

14. The method according to claim 1, wherein the mark comprises active and inactive dots in which the ratio between active and inactive can be as low as 10% and represents the pattern.

15. The method to detect a mark applied according to the method of claim 14, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

16. The method to detect a mark applied according to the method of claim 1, comprising the following steps:
acquiring an image comprising the mark,
auto-correlating the acquired image so as to determine the rotation and the scaling factors,
applying the rotation and scaling factors in a cross-correlation process between a referenced mark and the acquired image,
determining the maximum energy peaks of the cross-correlation process and comparing these energy peaks with a reference.

17. The method according to claim 16, wherein the rotation and scaling factors are applied on the referenced mark.

18. The method according to claim 16, wherein the rotation and scaling factors are applied on the acquired image.

19. The method according to claim 16, wherein it comprises a further step of removing the underlying image on the acquired image by calculating an average value of the acquired signal over a first surface, and subtracting this average value on a unitary acquired surface, said first surface being larger than the unitary surface.

20. The method according to claim 16, wherein a particular mark pattern initialized by a key is identified by successively cross-correlating several different pseudo-random patterns from a library of possible mark patterns, each pattern being initialized by a different key, until the matching particular mark pattern is found.

21. A method for authenticating and tracing an industrially printed material comprising:
applying a mark in a manner that is invisible for the naked eye based on the creation of pseudo-random defects on the surface of said material by the means of an industrial printing technology using a liquid substance capable of solidification upon drying in which the liquid substance is deposited over at least a portion of the material with a regular thickness in areas other than individual locations corresponding to active dots of the mark and having a modulated thickness in areas corresponding to the active dots of the mark, the active dots representing a pseudo-random two dimensional pattern initialized by a key, said substance modifying at least one optical characteristic of said material;
wherein said defects having an individual size ranging from 10 to 500 micrometers.

* * * * *